Jan. 8, 1963 T. T. LUNDE ET AL 3,072,074
DUMPING OPERATION CONTROL FOR TILTING RAILWAY DUMP CARS
Filed April 26, 1955 6 Sheets-Sheet 1

INVENTORS
Thomas T. Lunde and
Francis L. Lindemuth
BY Henry W. Kachel
ATTORNEY

Jan. 8, 1963 T. T. LUNDE ET AL 3,072,074
DUMPING OPERATION CONTROL FOR TILTING RAILWAY DUMP CARS
Filed April 26, 1955 6 Sheets-Sheet 6

INVENTORS.
Thomas T. Lunde
Francis L. Lindemuth
BY
Webb, Mackey+Burden
THEIR ATTORNEYS

United States Patent Office

3,072,074
Patented Jan. 8, 1963

3,072,074
DUMPING OPERATION CONTROL FOR TILTING RAILWAY DUMP CARS
Thomas T. Lunde, Ross, Calif., and Francis L. Lindemuth, Youngstown, Ohio, assignors to The William B. Pollock Company, Youngstown, Ohio, a corporation of Ohio
Filed Apr. 26, 1955, Ser. No. 504,024
12 Claims. (Cl. 105—1)

This invention relates to so-called self-dumping cars, one such kind of car is used for disposing of and dumping molten slag from steel mills. Such cars used at present consist of a chassis mounted on wheels and having rockably mounted on the chassis a body like a ladle for carrying the slag or other material. The body or ladle is generally pivoted, hinged, or rocked on suitable pedestals on the chassis so as to dump the contents on one side, or the other, of rails upon which the car travels. This body may be dumped by means of an air operated cylinder and brought back to an upright position by means of a four-way control valve for further use. Air is supplied to the cylinder through the control valve by piping extending the length of the cars. This piping is connected by well known means between the cars, such as, by flexible hose couplers. The air supply originates at a compressor in the locomotive and is stored in a receiver from where it is fed into the piping for operation of the air cylinders. A lock may be provided for holding the car bodies in an upright position on their chassis and to prevent premature dumping of the cars.

When a train of these cars motivated by a locomotive arrives at the place where the cars are to be dumped, a man on the ground moves from car to car as the successive cars are emptied. At the first car, this man opens the lock, then operates the valve to dump the ladle, then brings the ladle back to its upright position and again locks it. He then moves on to the next car, and so forth until the entire train has been emptied. It will be apparent that during this dumping operation the man on the ground is not only subjected to the intense heat of the molten cinder and slag but in case of a mal-operation, he may also get severly burned. In fact, malfunctioning of the apparatus is not necessary to create a hazardous condition as a man standing beside or near the car being dumped may be burned by spills and splashes of molten materials as the car is either being moved or dumped.

Our present invention has for one of its objects, the elimination of the necessity for this man on the ground to move from car-to-car during the dumping thereof and thus prevents this hazard.

Another object of our invention is to provide a means for selecting the car or cars to be dumped and to dump them from a remote location. This location may be in the locomotive cab where the locomotive engineer will control the dumping operation or it may be from an operating station at the dump to which the controls will be connected as hereinafter described.

Still another advantage of this invention is that the system can be arranged so that the operator can be certain as to which car is being emptied so that he can spot them at a location and be sure that the located car will be emptied when he operates the control.

Another feature of our invention is the fact that all cars are duplicates, any car may be located at any position in the train and can be dumped as to position in the train from the control in the locomotive or from the operating station.

Other objects and advantages of our invention will become evident, to those skilled in the art, from the following description, taken in conjunction with the accompanying drawings in which:

FIGURES 11 and 12 are diagrammatic views showing the invention applied to cars dumped by electric motors.

Figure 1:
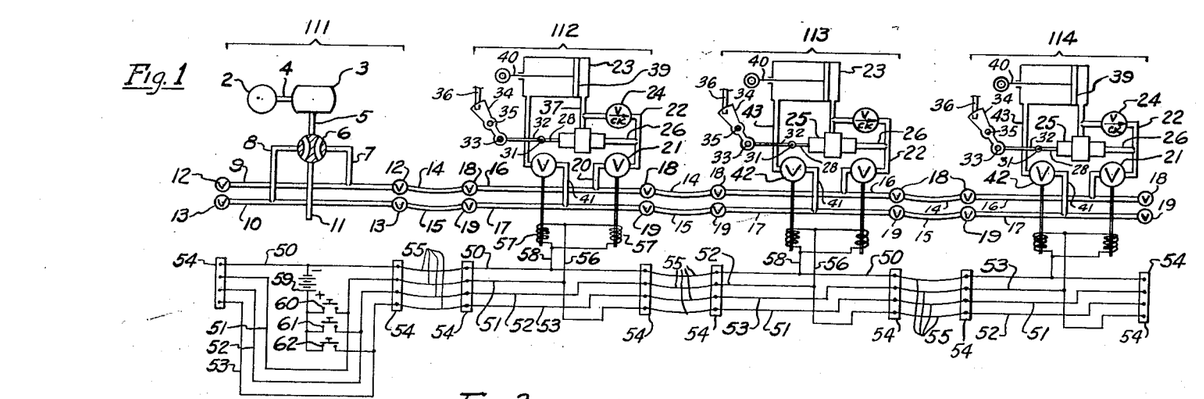
FIGURE 1 is a diagrammatic view of dumping and control equipment on a typical train composed of a locomotive and three cars.

Referring now to FIGURE 1 of the drawings, which is a diagram of dumping and control or selecting equipment on a train, there is shown diagrammatically a locomotive 111 and three cars, the one next to the locomotive being indicated at 112, the middle car being indicated at 113 and the end car being indicated at 114. In accordance with our invention, the dumping equipment in the locomotive comprises an air compressor 2 operated from any suitable motive power in the locomotive 111 and an air receiver 3. A pipe 4 connects the air compressor 2 to the receiver 3 and leading from the receiver is a pipe connection 5 to a four-way valve 6. The four-way valve 6 has connections 7 and 8 communicating with pipes 9 and 10 running the length of the locomotive. The other connection 11 of the valve 6 is an exhaust pipe discharging at a convenient location. It will be apparent that with valve 6 turned to the proper position air will be admitted from the receiver 3, through pipe 5, through valve 6 and connection 7 into the longitudinal piping 9. Also, longitudinal piping 10 will have communication through pipe 8 and valve 6 to exhaust pipe 11.

At both ends of longitudinal pipes 9 and 10 are valves 12 and 13 respectively which are adapted to be releasably joined to flexible connectors or couplers 14 and 15 respectively, said connectors being well known in the art. It will be apparent that when locomotive 111 is operating as shown in FIGURE 1, that the valves 12 and 13 at the left end of the locomotive will be closed and the corresponding valves 12 and 13 at the opposite end of the locomotive and communicating with flexible connections 14 and 15 will be open for motivation of the dumping apparatus hereinafter described.

Connectors 14 and 15 will also be provided between all cars so as to connect communication from the receiver in the locomotive to each car to operate its dumping mechanism.

Figure 2:
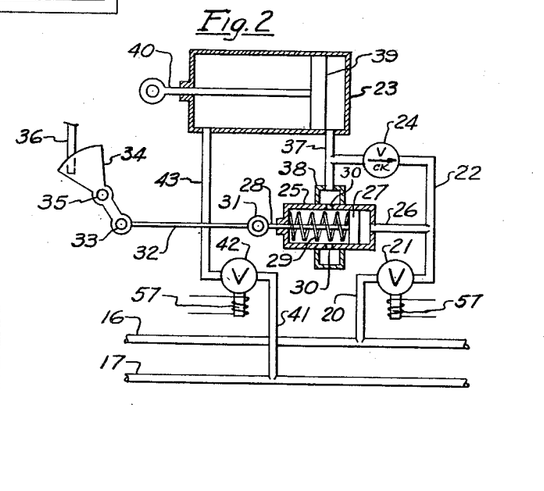
FIGURES 2, 3, and 4, are detail diagrams of the locking mechanism shown on a larger scale.
Figure 2:
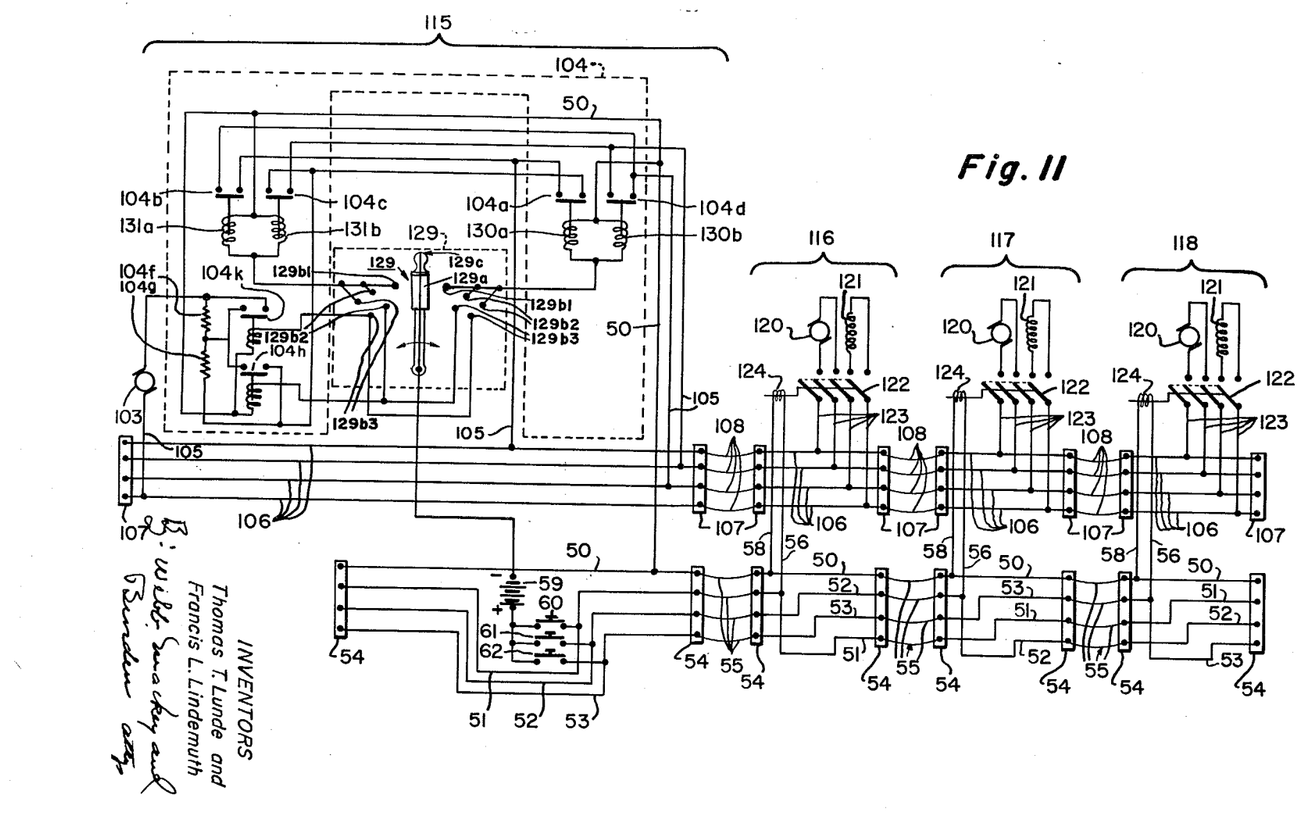
Figure 3:
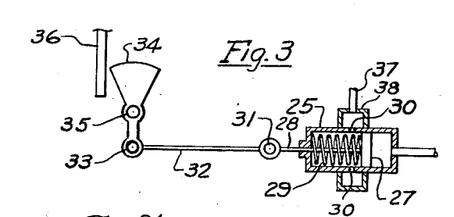
Figure 4:
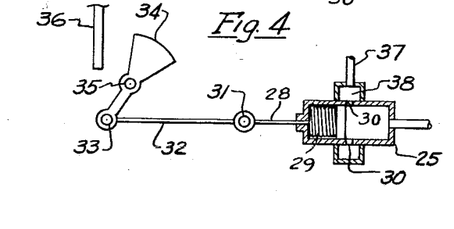

In each of the dump cars, such as 112, is provided longitudinal pipes 16 and 17 having valves 18 and 19, respectively, at both ends thereof. These valves 18 and 19 will be normally open on all cars at inner locations on the train and the valves will be closed at the end of the last car opposite the locomotive, or opposite the operating station as the case may be. Connected to pipe 16 (see FIGURE 2) is a branch pipe 20, on car 112, which leads to a solenoid operated valve 21. Also, leading from valve 21 is a pipe 22 connected to the right end of the dump cylinder 23, as shown in FIGURES 1 and 2. In pipe line 22 between valve 21 and cylinder 23 is located a check valve 24 which prevents air from flowing to cylinder 23 from valve 21 but will permit flow of air in the opposite direction. A lock operating cylinder 25 has its right end connected to a branch pipe 26 leading from pipe 22 between the check valve 24 and the solenoid operated valve 21. Within the lock operating cylinder 25 is a piston 27, piston rod 28, and a spring 29 around the rod and compressed to urge the piston 27 to the right so as to normally close a series of ports 30 located between the ends of cylinder 25. The end of piston 28 is pivotally connected at 31 to a connecting link 32 which in turn is pivotally connected at 33 to the locking member 34 which is mounted on shaft 35 carried by the car chassis. On the body of the car, and movable with the vessel, there is a member 36 which moves with respect to the stationary chassis of the car as the body is dumped, and holds the lock open in well known manner by engagement with the locking member 34 mounted on the chassis when the body is in any position other than an upright position. There are many variations in the details of this locking mechanism and it per se is not our present invention. FIGURE 3 shows the locking member 34 disengaged from member 36 by movement of the piston 27 to the left and, FIGURE 4 illustrates the piston moved still farther to the left so that the series of ports 30 is uncovered and air pressure is supplied through connection 37 to cylinder 23. There are a great variety of designs of self-dumping cars, and in FIGURES 13 and 14, we show a simple design of car and a simple lock to illustrate how a lock could be applied to the car shown.

Figure 13:
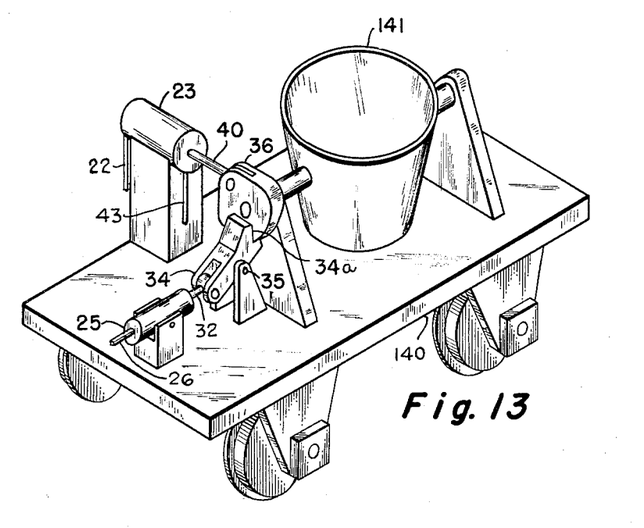
FIGURES 13 and 14 are perspective views of a dump car together with its locking mechanism and its dumping mechanism.
Figure 14:
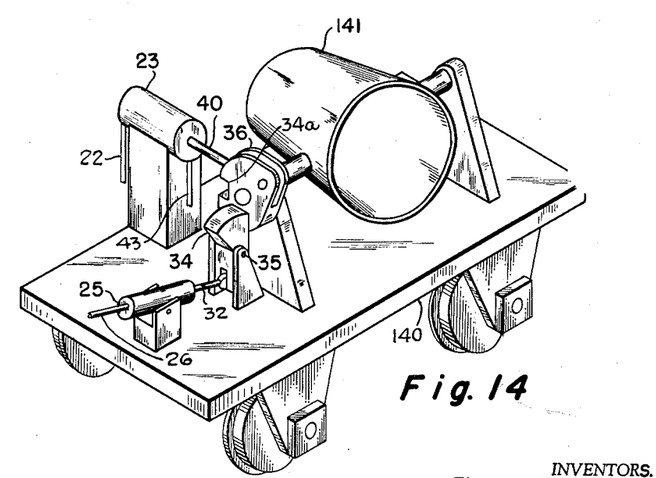

Referring to FIGURES 13 and 14, a chassis 140 of a car mounts a body 141 which is tilted to dump the slag therein. In FIGURE 13, the body is in a vertical position, and the lock 34 is engaged in a slot 34a in the member 36. To dump the body, cylinder 25 first disengages the lock from the slot 34a in member 36, then cylinder 23 tilts the body 141, as shown in FIGURE 14. When the cylinder 23 is reversed and the body 141 comes into the vertical position, lock 34 drops into the slot 34a in member 36, and the body is then locked in its vertical position, as shown in FIGURE 13.

A particular kind of lock is not a part of our invention and may be varied to suit the particular kind of car to which it is applied.

The pipe connection 37 extends from a chamber 38, around the ports 30, to the right end of dumping cylinder 23. A piston 39 is provided in cylinder 23 having a connecting rod 40 which will be connected in well known manner to apparatus on the body or vessel to move it either to the dumping position or to the upright position. Connected to the longitudinal pipe 17 is a branch connector 41 which leads to another solenoid operated valve 42 similar to valve 21. At the other side of valve 42 a line 43 communicates with the left end of the dumping cylinder. Thus, when piston 39 moves to the left as viewed in FIGURES 2, 3, and 4, the left end of cylinder is exhausted through line 43, valve 42, and branch connection 41 to longitudinal pipe 17.

After the car is dumped, valve 6 on the locomotive is reversed, pressure through branch connection 41, valve 42 and line 43 is reversed to put the left end of cylinder 23 under pressure and to move the piston 39 to the right (FIGURE 2) to bring the body to the upright position. During this reversal, pipes 20, 22 and 26 are open to the now exhaust line 16, and spring 29 through its action returns the locking member 34 to its locked position. During this return operation the piston 27 will cover the ports 30, but the cylinder 23 will continue to exhaust through line 37, check valve 24, pipe 22, solenoid valve 21 and pipe 20 to the exhaust line 16. When the car body is upright the spring 29 has closed the lock 34. The solenoids are de-energized, and valves 21 and 42 are closed. This same procedure is followed on each of the individual cars until the entire train is dumped.

The detailed apparatus just described comprises the dumping mechanism for the actual motivation of the body or vessel itself as distinguished from the control system for that mechanism.

The control system preferred in accordance with our invention is an electrical control system as illustrated in FIGURE 1 where four wires run the entire length of the locomotive and cars, one of these wires designated 50, we shall term a negative wire, and wires 51, 52, and 53, we shall designate positive wires for convenience in description, it being understood that the terms "positive" and "negative" are used only to distinguish between the two wires of an electric circuit, and not to limit the direction of flow of current in this invention. The wires 50, 51, 52 and 53 go to connectors, 54—54 commonly called receptacles, at each end of the locomotive and also at each end of each of the individual cars. A connector 55 is provided between the locomotive and the adjacent car and similar connectors 55 are also provided between the ends of adjacent cars to connect similarly designated wires in the receptacles at the end of the locomotive and adjacent car as well as between the ends of adjacent cars.

On car 112 next to the locomotive 111, wire 51 on the car is opposite wire 51 on the locomotive, wire 52 on the car is opposite wire 52 on the locomotive and wire 53 on the car is opposite wire 53 on the locomotive. At the connector on the opposite end of car 112, wire 52 is advanced so that in the connector it will be opposite 51 on the first end of the car, wire 53 is advanced so that in the connector it will be opposite wire 52 on the first end of the car and wire 51 to be opposite 53, but wire 50, the negative wire which is common to all of the car circuits, has the same position at both ends of all the cars and at both ends of the locomotive. A connection 56 from line 51 on car 112 goes to the solenoids 57 to actuate them and returns through line 58 to the return circuit 50.

The valve 21 and a solenoid 57 comprise an operable control means connected into pipe 20 for regulating operation of the dump cylinder 23 or motor for dumping a car such as car 112.

A source of power 59 which can be an electric generator or a battery, is provided at the locomotive and is selectively connected in circuit between wire 50 and wires 51, 52 and 53, by means of switches 60, 61, and 62, respectively. These switches are selected by the operator to dump the cars in any desirable order, that is, the closing of switch 60 will dump car 112, the closing of switch 61 will dump car 113 and the closing of switch 62 will dump car 114.

Wires 50, 51, 54, 56 and 58 comprise a transmission means which connects the operable control means of one car such as car 112 to the operator's station and to a source of power for conveying power from the source through the operator's station to the operable control means of car 112. For each of the other cars corresponding wires comprise a transmission means which performs the same function as the transmission means referred to above.

This transmission means also includes a power flow control means such as the switch 60 which is interconnected into the wires 50 and 51 at the operator's station for regulating flow of power therethrough in operating the operable control means of car 112.

A complete operation of the equipment for dumping one car as shown in FIGURE 1, is as follows:

The receiver 3 will have sufficient pressure up to operate the dumping mechanism, and valve 6 will be turned to the proper position to supply air to line 16 and to exhaust through line 17; switch 60 on the locomotive will be closed causing current to flow through conductor 51 and connection 56 to energize solenoids 57—57 and open valves 21 and 42. This allows air to flow from line 16 through valve 21 and line 26 to unlock lock 34 after which air flows into the right end of dumping cylinder 23 causing the piston 39 to move to the left and exhausts from the left end through line 43, through open valve 42 and to the exhaust line 17. As heretofore explained, movement of the piston 39 to the left dumps the cars after which they are again brought to the upright position. Switch 60 is then opened and switch 61 is closed to repeat the operation with respect to car 113 and similar procedure is followed for the dumping of car 114.

With this selecting arrangement the train of cars can be turned end-for-end with regard to the locomotive, or the locomotive may be placed at either end of the train or the locomotive can be turned end-for-end and will still operate satisfactorily. The drawings show three cars with comparable number of control switches in the locomotive, and a comparable number of positive wires in the cars, and the locomotive with one common return circuit; it will be apparent that without departing from the invention, provision can be made for operating additional cars in the train by adding an additional switch in the locomotive and an additional positive wire for each car added to the train. It will be evident that by selecting and closing the proper switch or switches in the locomotive, the cars may be dumped in any sequence, or as many cars may be dumped at a time as may be desired.

It may in some instances be desirable to select and dump the cars from some other location than the locomotive, in which case similar equipment to that provided in the locomotive could be placed in a control station at the dump and air connectors and electrical connections made there to operate the dumping of the car.

It will also be apparent to those skilled in the art that the so-called "negative" wires could be omitted and the circuit could be grounded to the chassis of the cars and the body of the locomotive to the rails, or if desired, another variation would be to have a separate negative wire for each circuit, that is, to have a complete two wire circuit for each switch control.

Figure 5:
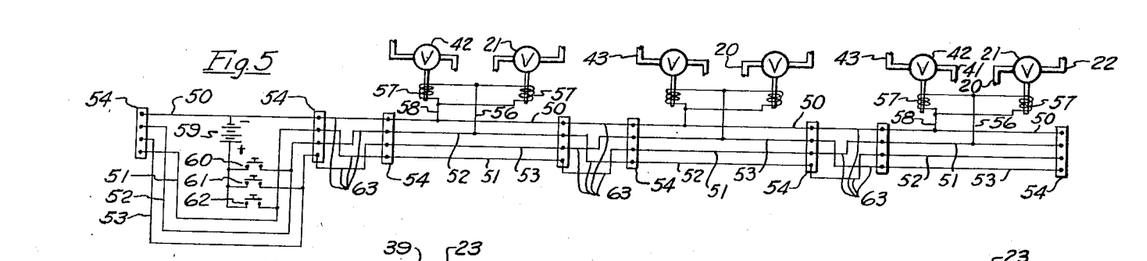
FIGURE 5 is a diagrammatic view similar to FIGURE 1, except it is a variation thereof.

A modification of the invention is illustrated in FIGURE 5, wherein instead of advancing the positive wiring into the position of the adjacent circuit from one end of the car to the other, the circuits go straight through each car, and the wires are advanced in the flexib'e connectors 63 between the car and the locomotive, and between the cars. In this FIGURE 5, only the selecting equipment is shown, the rest of the mechanism being similar to that shown in FIGURE 1, and similar numbers are used to identify similar parts. This arrangement is not as flexible with regard to turning the train of cars and the locomotive end-for-end as is the arrangement shown in FIGURE 1.

A modification of the locking and unlocking mechanism is illustrated in FIGURES 6, 7, 8, and 9, wherein corresponding parts are identified by numbers similar to the parts of FIGURE 1. A cylinder 65 for actuating the unlocking mechanism is provided to receive air pressure from line 26. Piston 66 in cylinder 65 is provided with piston rod 68a connected to linkage 68 having a slot 64 therein to provide a certain amount of lost motion in the linkage system hereinafter described. A spring 67 is provided in the cylinder 65 to normally urge the piston to the right. At the end of the linkage 68, at 69, is pivotally connected connecting link 70 which in turn is pivotally connected at 33 to the locking member 34.

Figure 6:
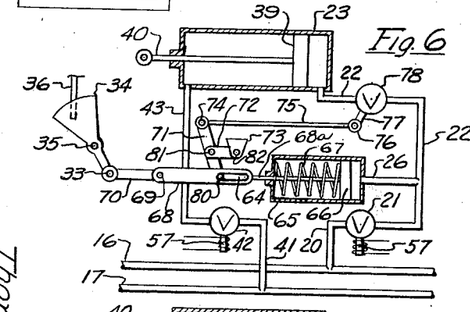
FIGURES 6, 7, 8, and 9, are detail diagrams on a larger scale of a modification of the locking mechanism.

A cut-off valve 78 is provided in line 22 having its operating arm 77, connected at pivot 76 to connecting link 75, which in turn is pivotally fastened at 74 to link 71 which is pivoted at 81 near its mid-point to link 72 pivotally fixed at 82 to a lug 73 fixed on the car chassis.

Figure 7:
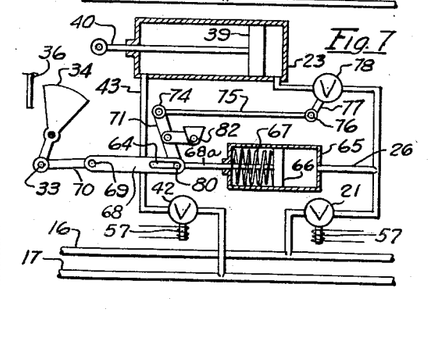
Figure 8:
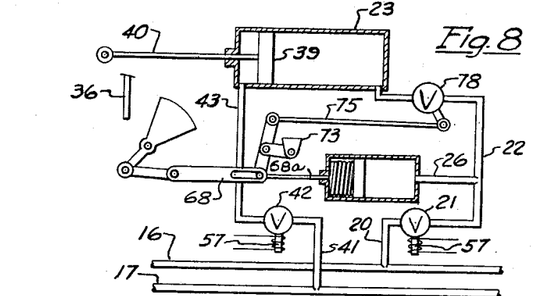
Figure 9:
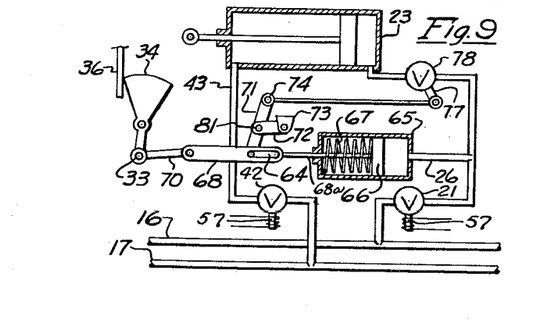

Referring now to FIGURE 6, lock 34 is shown engaging member 36 and the shut-off valve 78 is closed, when pressure is applied through line 26 to cylinder 65, piston 66 moves to the left and through the linkage 68, and 70 the first part of the travel of the piston disengages the locking member 34 as shown in FIGURE 7. During this movement, the slot 64 of the linkage 68 moves and the connecting pin 80 remains stationary so that no movement of link 71 or connecting link 75 is caused and shut-off valve 78 remains enclosed. However, upon continued movement to the left of piston 66 the pin 80 contacts the end of slot 64 causing the link 71 to rotate in a clockwise direction about its pivot 81, moving connecting link 75 to the right and causing the operating arm 77 of valve 78 to open the valve and admit pressure to the right end of the dumping cylinder 23, as illustrated in FIGURE 8. The car is then dumped and the valve 6 in the locomotive is then reversed to put pressure in line 17 and exhaust through line 16 and again bring the car body to an upright position. During the return to an upright position, cylinders 23 and 65 are open to the exhaust and spring 67 will urge the piston 66 back to its right-end position and will also bring lock 34 toward its engaged position. However, member 36 will prevent lock 34 from making its full travel and thus hold valve 78 open until the car is in full upright position. When the car is in upright position, member 36 will allow lock 34 to again move to locking position, the additional movement of linkage 68 through the attendant linkage will close valve 78 and the mechanism will again be in position shown in FIGURE 6, and ready for another operation.

Regarding the modification of the locking and unlocking mechanism of FIGURES 6–9, the valve 21 and solenoid 57 comprise a first operable control means connected into the pipe 20 and the valve 78 comprises a second operable control means regulated by linkage 71, 72 and 75 and connected into pipe 22.

Figure 10:
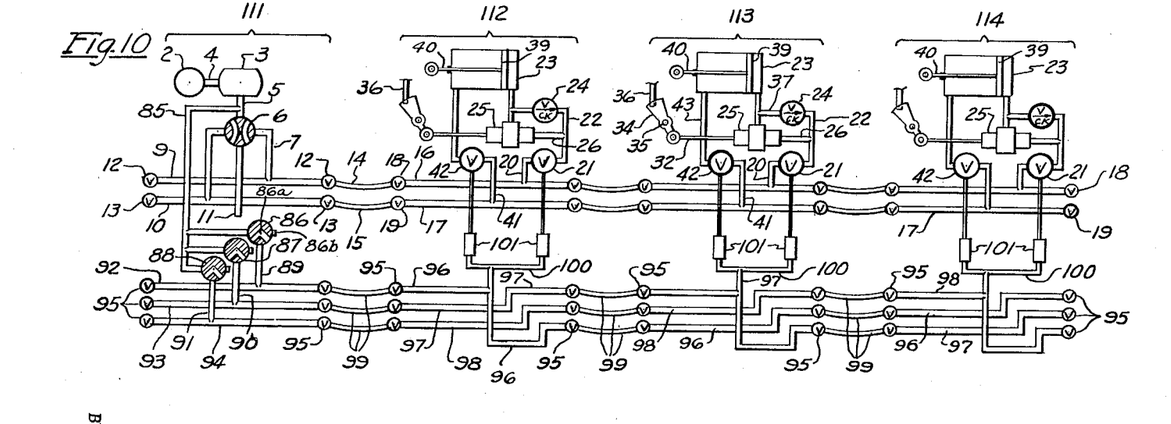
FIGURE 10 is a diagrammatic view of dumping and control equipment in which the control system is pneumatically or hydraulically operated.

If electricity is not available for operating the selecting equipment on cylinder-dumped cars, air or steam or other suitable fluid may be used for the pumpose as specifically shown in the modification of FIG. 10. Parts in FIG. 10, corresponding to those heretofore described are given similar numbers.

The control selection system in this figure comprises a connection 85 from the receiver 3 leading to three three-way valves 86, 87, and 88. These valves are interposed between connection 85 and branches 89, 90 and 91 connected to pipes 92, 93 and 94, respectively which run the length of locomotive 111. At the ends of each of the pipes 92, 93 and 94 are provided shutoff valves 95—95. Each of the cars in the train will also be provided with longitudinal pipes such as 96, 97 and 98 which extend the length of the car and are also provided at each end with shutoff valves 95—95. Connectors 99 are provided between the locomotive and the adjacent car and also between adjacent cars. The shutoff valves 95 at the front of the locomotive and those at the rear of the last car will be closed and all other valves 95 will be open for communication between the locomotive and the various cars.

When valve 86 is turned to connect line 92 with receiver 3 through connection 85 pressure will be conducted to line 96 of car 112 and through branch pipe 100 and auxiliary valve parts 101 to the two valves 21 and 42 as previously described in connection with FIGURE 1. These valves will be normally closed as by a spring, but are opened by pressure admitted to the auxiliary parts 101. Similar to the control wires of FIGURE 1, the control pipes on car 112 of FIGURE 10 as pipe 96 is opposite pipe 92 on the locomotive, pipe 97 is opposite pipe 93 on the locomotive and pipe 98 is opposite pipe 94 on the locomotive. On the other end of the car 112 the pipes are advanced one position, as shown, and in the same manner as are the control wires of FIGURE 1.

Pipes 85, 89, 96 and 100 also comprise a transmission means which connects the operable control means of a car such as car 112 to the operator's station and to the source of power shown as the compressor 2, etc. for conveying power from the source through the operator's station to the operable control means of the car 112. This transmission means also includes a power flow control means such as valve 86 which interconnects pipes 85 and 89 at the operator's station for regulating flow of power therethrough in operating the operable control means of the car 112.

In the operation of this modification valve 6 will be turned to supply pressure through line 9 to the length of the car in line 16. Then to dump car 112 the valve 86 is turned to provide communication between the receiver 3 through branch line 85 to connection 89 and into line 92 then through connectors 99 into line 96 branch 100 to auxiliary parts 101 to actuate valves 21 and 42 to supply pressure from line 16 to cylinders 25 and 23 and to exhaust through the valve 42 into line 17. After this car is dumped valve 86 will be turned to exhaust position whereat passageway 86a interconnects connection 89 and exhaust port 86b and parts 101 will close valves 21 and 42. Then, to dump car 113 valve 87 will be operated in a similar manner. The same operation will then be repeated with valve 88 to dump car 114. It will be apparent that provision can be made for dumping as many cars as desired in a train by adding an additional three-way valve and one longitudinal pipe line on the locomotive and one additional pipe line on each car for each additional car to be added to the train.

The dumping cylinder 23 heretofore described is a double-acting cylinder, that is, one in which pressure to operate it can alternately be admitted to both ends. If only a single-acting cylinder is required, as for example, on a car in which the body or vessel will return to the upright position by gravity, then the exhaust line can be omitted and only one line such as 9 and 16 in the locomotive and cars will be required and a three-way valve can be used in place of four-way valve 6. Also, in such an arrangement branch line 41 and valve 42 could be omitted.

While the description with respect to the invention thus far provides for dumping the cars to one side or in one direction. They may be dumped in the opposite direction by providing means to reverse the connections 22, 37 and 43 to the dumping cylinder 23. Or, alternatively as is now sometimes practiced, the cars can be turned around before being transported to the dumping location.

Our invention further contemplates that instead of dumping the cars by fluid pressure the invention can with equal facility be applied to cars dumped by means of electric motors with suitable connections between the motors and the car bodies.

Figure 12:
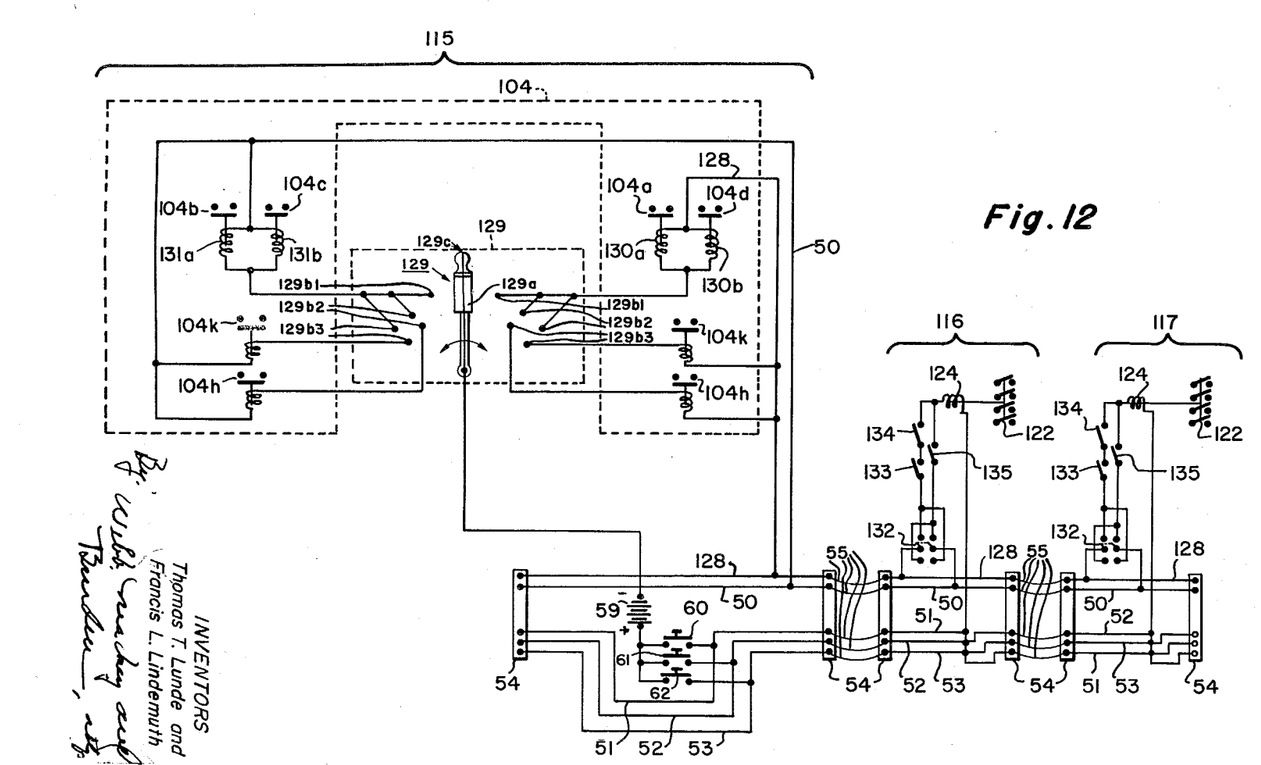

Such a system is diagrammatically shown in FIGURES 11 and 12 where a locomotive 115 and cars 116, 117 and 118 are shown. The dumping equipment on the locomotive comprises a generator 103, a reversing control 104, four power wires 106 running the length of the locomotive and cars with suitable connectors 107 at the ends of the locomotive and and cars. Four connections 105 extend from the control 104 to the power wires 106. Connectors 108 are provided between the locomotive 115 and car 116 and similar connectors 108 will be provided between adjacent cars in the train. Cars 116, 117 and 118 are identical and are each equipped with a reversing dumping motor having an armature 120 and a field 121. The four terminals of the armature and field are connected to the terminals of normally open switches 122, the opposite terminals of which are connected to the four power lines 106 by connections 123. The normally open switches 122 may be closed by energizing a solenoid 124 which in turn energizes the dumping motor. The solenoid 124 and the switches 122 comprise an operable control means connected into the electrical circuits for regulating operation of each reversing dump motor consisting of armature 120 and field 121 for dumping the cars 116, 117 and 118. The selecting equipment on the locomotive is exactly the same as described in connection with FIGURE 1 and the selecting equipment on the cars 116, 117 and 118 is the same as that in FIGURE 1 except that only one solenoid 124 is provided instead of the two solenoids 57—57 of FIGURE 1. For that reason, the equipment is designated by the same numbers as in FIGURE 1 for the corresponding parts.

For the source of power in the selecting system is shown the battery 59, however, it will be understood that a separate electric generator can be used or the generator 103 can be used as the source of power.

In the apparatus shown in FIGURE 11, the cars are selected in the same manner as for the cylinder dump cars, and are each dumped by operating the controller 104 by means of a manually operated master switch 129 instead of a valve as on the cylinder-dumped train. This master switch 129 comprises a movable contactor 129a which when moved manually by a handle 129c to the right or left viewing FIGURE 11 engages fixed contacts 129b1, 129b2 and 129b3 to energize circuits whose functions are described hereinafter. Switches 104a, 104b, 104c and 104d comprise a conventional remotely controlled contactor arrangement to control the direction of current flow through the armature 120 and the field 121 of each dumping motor for reversing the motor to right the body 141 after tilting it as shown in FIGURE 14. Also shown are conventional resistances 104f and 104g controlled by contactors 104h and 104k. The resistances 104f and 104g limit the current when starting the motors and as the master switch is moved to increase speed of the motors, these resistances 104f and 104g are cut out of the circuits. Cutting out of these resistances results from advancing the movable contactor 129a from contact 129b1 to contacts 129b2 or 129b3. While our diagram shows the motors on the cars as direct current, series-wound motors, and the control on the locomotive as a common arrangement for this kind of motor, any appropriate kind of electric current generator, motors and controls may be used within the scope of this invention.

A lock may not be required on the motor-dump cars, as the reducing mechanism between the motor and the car body may be self-locking, or the motor may be equipped with a brake which will lock it. Generally no change over in the connections 123 to the electric motor switches is required to dump to one side or the other side of the car. The cars may be turned end-for-end with regard to the locomotive and after the connectors 108 are plugged in the mechanism will work satisfactorily. The locomotive may also be turned end-for-end with regard to the train of cars and after connectors 108 are connected the system can be satisfactorily operated. It will also be understood that additional cars may be added to the train simply by providing additional circuits to the selecting and dumping mechanism, in the same manner described for the cylinder-dump cars.

FIGURE 12 illustrates a modification of our invention in which limit switches to limit the amount of travel of the pot or vessel as it is dumped and righted are shown. These limit switches will be in the selector and motor control wiring, and not in the power circuit to the motors. For simplicity in illustration, we do not show the power circuits, but only sufficient control wiring to describe how the limit switches are connected in two cars, it being understood that the control wiring will be duplicated in the other cars. In this figure there is provided a manually operated master switch 129 which will again be part of a reversing control 104 and which may be closed to the right or to the left to control a similar motion in the vessel. This master switch 129 when moved to one closed position or the other will energize solenoids 130a and 130b or solenoids 131a and 131b depending on which direction, either right or left, respectively, in which the closing is made. Energization of solenoids 130a and 130b or 131a and 131b will close contacts in well known manner in the reversing control 104 to run the dumping motor armature 120 and energize its field 121 in one direction or the other.

A second negative wire 128 is added on the locomotive and on the cars. Also contactors 104k and 104h are duplicated in the second negative wire 128 in the controller 104 and on the cars negative wires 50 and 128 are connected in parallel with the switch operating solenoid 124. In this control circuit on car 116 are limit switches 133 and 134 in series with one of the negative wires and limit switch 135 is in the circuit of the other negative wire, the connections depending on the position of a reversing switch 132. This reversing switch 132 is provided to connect limit switches 133 and 134 to line 50 or to line 128 and at the same time to connect limit switch 135 to line 128 or to line 50, depending upon which side it is desired to dump the car. Suppose switch 132 is closed in the upper direction, with reference to FIGURE 12, then when the car body is in the upright position limit switch 135 is open and limit switches 133 and 134 are closed. Then to dump car 116 to the left, viewing FIGURES 13 and 14, selector switch 60 is closed and master switch 129 is moved, say to the right, this energizes solenoids 130a and 130b to close the contacts in controller 104 to start the dumping motor in one direction through wire 128 and now closed limit switches 133 and 134 energize solenoid 124 which with closed switch 122 completes the power circuit to the motor armature 120 and field 121. Switch 135 at this time is open, but closes after the body has moved. When the pot has moved to its fully dumped position, one limit switch as 134 will open, and solenoids 130a, 130b and 124 will be de-energized opening contactors 104a and 104b and switch 122 will open thus stopping the dumping motor. The motor now cannot be made to travel any further in this direction, but after the dumping operation is completed, master switch 129 will be moved to its left closed position which will energize solenoids 131a and 131b in control 104 and through wires 50 and closed switch 132, the limit switch 135, which is now closed, will energize solenoid 124 to complete the motor circuit by closing switch 122 and the dumping motor is reversed and the car body moves toward the upright position. When the body comes to the upright position limit switch 135 opens, and there can be no further movement in this direction. It will be apparent that simply by moving the master switch 129 to the right or to the left, the motor may be stopped and started in either direction at any place in its travel between the points where switches 134 and 135 are opened. It will be understood that these limit switches may be placed along the path of the body and will be actuated by the body when it arrives at that particular position, or may be actuated by the connection between the motor and the car body.

If the car is to be dumped in the opposite direction namely, as shown in FIGURE 14, switch 132 is reversed and the dumping motor is started by closing the master switch 129 to the left, the motor will then continue until limit switch 133 is opened. The car body will then be brought back to the upright position by turning master switch 129 to the right. With the mechanism just described, the cars can be dumped only to one or the other side depending upon which way switch 132 is closed, and the car cannot be accidentally dumped toward the opposite side, nor can it over-travel beyond the position for which the limit switches are set. Switch 132 as located on car 116 will be duplicated on all the other cars as will also the wiring arrangement. It will also be understood that this switch 132 could as well be placed in the locomotive between the wires 50 and 128.

The above descriptions are of cars handling molten slag from a steel mill and dumped by air cylinders or electric motors. Our invention also applies to cars, handling other kinds of materials, dumped by cylinders actuated by air, or steam, or other fluids, or by electric motors.

While we have described herein certain embodiments of our invention which will be eminently satisfactory in use, we do not thereby desire or intend to restrict or confine ourselves specifically thereto as many changes can be made in the design, construction and arrangement of the mechanical and electrical instrumentalities employed and in the circuits by which the latter are controlled and actuated without departing from the spirit and scope of the invention as defined in the appended claims.

Having thus described our invention, we claim and desire to protect by Letters Patent of the United States:

1. On a train having at least two cars, each of which is shiftable into different given positions along the length of said train and each with a chassis on which is mounted a body for tilting relative to said chassis to dump said body; having motor means on each car to operate the body to dump it; a source of power for operating each motor means; and the train having power conveying lines connecting said power source to each of said motor means; a control system for regulating dumping of each body separately and independently from one another and for selectively dumping a given body of said train comprising an operator's station on said train, an operable control means for each motor means located on each of said cars and connected into the power conveying lines which connect the power source to the motor means on each car for regulating operation of said motor means, a first transmission means connecting the operable control means of a first car of the train to said operator's station and to said source of power for conveying power from said source through said station to said operable control means of the first car, a second transmission means connecting the operable control means of a second car of the train to said operator's station and to said source of power for conveying power from said source through said station to said operable control means of the second car, said first transmission means including a first power flow control means located at said operator's station, and interconnected into said first transmission means for regulating flow of power therethrough in operating the operable control means of the first car, said first power flow control means being the sole control means for regulation of flow of power through said first transmission means to the operable control means of a car in the position of said first car, said second transmission means including a second power flow control means located at said operator's station and interconnected into said second transmission means for regulating flow of power therethrough in operating the operable control means of the second car, said second power flow control means being the sole control means for regulation of flow of power through said second transmission means to the operable control means of a car in the position of said second car, said first and second transmission means being adapted to be connected to and disconnected from their respective operable control means so that dumping of a body of any of said cars placed in the position of said first car in the train and connected to the first transmission means is controlled by said first power flow control means and so that the dumping of a body of any of said cars placed in the position of said second car in the train and connected to the second transmission means is controlled by said second power flow control means.

2. On a train having at least two cars, each of which is shiftable into different given positions along the length of said train and each with a chassis on which is mounted a body for tilting relative to said chassis to dump said body; having motor means on each car to operate the body to dump it; a first source of power for operating each motor means; and the train having power conveying lines connecting said first power source to each of said motor means; a control system for regulating dumping of each body separately and independently from one another and for selectively dumping a given body of said train comprising an operator's station on said train, an operable control means for each motor means located on each of said cars and connected into the power conveying lines connecting said first source of power to the motor means on each car for regulating operation of said motor means, a first transmission means connecting the operable control means of a first car of the train to said operator's station and to a second source of power for conveying power from said second source through said station to said operable control means of the first car for operating said operable control means, a second transmission means connecting the operable control means of a second car of the train to said operator's station and to said second source of power for conveying power from said second source through said station to said operable control means of the second car for operating said operable control means, said first transmission means including a first power flow control means located at said operator's station and interconnected into said first transmission means for regulating flow of power therethrough in operation of the operable control means of the first car, said first power flow control means being the sole control means for regulation of flow of power through said first transmission means to the operable control means of a car in the position of said first car, said second transmission means including a second power flow control means located at said operator's station and interconnected into said second transmission means for regulating flow of power therethrough in operation of the operable control means of the second car, said second power flow control means being the sole control means for regulation of flow of power through said second transmission means to the operable control means of a car in the position of said second car, said first and second transmission means being adapted to be connected to and disconnected from their respective operable control means so that dumping of a body of any of said cars placed in the position of said first car in the train and connected to the first transmission means is controlled by said first power flow control means and so that the dumping of a body of any of said cars placed in the position of said second car in the train and connected to the second transmission means is controlled by said second power flow control means.

3. The control system of claim 1 characterized by on said first car said second transmission means advancing into the position of the next adjacent transmission means between that end of the first car closer to the operator's station and the other end of the first car further removed from the operator's station.

4. The control system of claim 2 characterized by on said first car said second transmission means advancing into the position of the next adjacent transmission means between that end of the first car closer to the operator's station and the other end of the first car further removed from the operator's station.

5. The invention of claim 1 characterized by said motor means being a cylinder motor, by said source of power being a source of fluid pressure, by said operable control means for each motor means being a first valve means, by said first power flow control means being a second valve means and by said second power flow control means being a third valve means.

6. The invention of claim 2 characterized by said motor means being a cylinder motor, by said first source of power being a source of fluid pressure, and by said operable control means for each motor means being a valve means.

7. The invention of claim 5 characterized by a lock device on each car for holding the body in an upright position, a lock cylinder on each car connected to said lock device for operating same to permit dumping said body, said power conveying lines connecting said source of fluid under pressure to said lock cylinders, and said first valve means controlling operation of said lock cylinders.

8. The invention of claim 6 characterized by a lock device on each car for holding the body in an upright position, a lock cylinder on each car connected to said lock device for operating same to permit dumping said body, said power conveying lines connecting said first source of fluid under pressure to said lock cylinders, and said valve means controlling operation of said lock cylinders.

9. On a train having at least two cars, each of which is shiftable into different given positions along the length of said train and each with a chassis on which is mounted a body for tilting relative to said chassis to dump said body; having motor means on each car to operate the body to dump it; having a lock device on each car for holding each body in an upright position; having a lock operating means on each car connected to said lock device for operating same to permit dumping said body; a source of power for operating each motor means and each lock operating means; and the train having power conveying lines connecting said power source to each motor means and to each lock operating means; a control system for regulating dumping of each body separately and independently from one another and for selectively dumping a given body of said train comprising an operator's station on said train, a first operable control means for each lock device actuating means located on each of said cars and connected into the power conveying lines which connect the power source to the lock operating means for regulating operation thereof through a first linkage connecting the first operable control means and said lock operating means, said first linkage including a member with a slot, a first transmission means connecting the first operable control means of a first car of the train to said operator's station and to said source of power for conveying power from said source through said station to said first operable control means of the first car for operating said first operable control means, a second transmission means connecting the first operable control means of a second car of the train to said operator's station and to said source of power for conveying power from said source through said station to said first operable control means of the second car for operating said first operable control means, said first transmission means including a first power flow control means located at said operator's station and interconnected into said first transmission means for regulating flow of power therethrough in operating said first operable control means of the first car, said first power flow control means being the sole control means for regulation of flow of power through said first transmission means to the first operable control means of a car in the position of said first car, said second transmission means including a second power flow control means located at said operator's station and interconnected into said second transmission means for regulating flow of power therethrough in operating the first operable control means of the second car, said second power flow control means being the sole control means for regulation of flow of power through said second transmission means to the first operable control means of a car in the position of said second car, a second operable control means on each car interconnected into the power conveying means connecting said power source and said motor means for regulating operation thereof through a second linkage connecting said second operable control means and said first linkage at said slot of said member so that a predetermined amount of movement of said first linkage must occur before said second linkage operates said second operable control means, said first and second transmission means being adapted to be connected to and disconnected from their respective control means so that dumping of a body of any of said cars placed in the position of said first car in the train and connected to the first transmission means is controlled by said first power flow control means and so that the dumping of a body of any of said cars placed in the position of said second car in the train and connected to the second transmission means is controlled by said second power flow control means.

10. In a train having at least two cars, each of which is shiftable into different given positions along the length of said train and each with a chassis on which is mounted a body for tilting relative to said chassis to dump said body; having motor means on each car to operate the body to dump it; having a lock device on each car for holding each body in an upright position; having a lock operating means on each car connected to said lock device for operating same to permit dumping said body; a first source of power for operating each motor means and each lock operating means; and the train having power conveying lines connecting said first power source to each motor means and to each lock operating means; a control system for regulating dumping of each body separately and independently from one another and for selectively dumping a given body of said train comprising an operator's station on said train, a first operable control means for each lock operating means located on each of said cars and connected into the power conveying lines which connect the first power source to the lock operating means for regulating operation thereof through a first linkage connecting the first operable control means and said lock operating means, said first linkage including a member with a slot, a first transmission means connecting the first operable control means of a first car of the train to said operator's station and to a second source of power for conveying power from said second source through said station to said first operable control means of the first car for operating said first operable control means, a second transmission means connecting the first operable control means of a second car of the train to said operator's station and to said second source of power for conveying power from said second source through said station to said first operable control means of the second car for operating said first operable control means, said first transmission means including a first power flow control means located at said operator's station and interconnected into said first transmission means for regulating flow of power therethrough in operating said first operable control means of the first car, said first power flow control means being the sole control means for regulation of flow of power through said first transmission means to the first operable control means of a car in the position of said first car, said second transmission means including a second power flow control means located at said operator's station and interconnected into said second transmission means for regulating flow of power therethrough in operating the first operable control means of the second car, said second power flow control means being the sole control means for regulation of flow of power through said second transmission means to the first operable control means of a car in the position of said second car, a second operable control means on each car interconnected into the power conveying lines connecting said first source of power and said motor means for regulating operation thereof through a second linkage connecting said second operable control means and said first linkage at said slot of said member so that a predetermined amount of movement of said first linkage must occur before said second linkage operates said second operable control means, said first and second transmission means being adapted to be connected to and disconnected from their respective operable control means so that dumping of a body of any of said cars placed in the position of said first car in the train and connected to the first transmission means is controlled by said first power flow control means and so that the dumping of a body of any of said cars placed in the position of said second car in the train and connected to the second transmission means is controlled by said second power flow control means.

11. On a train having at least two cars, each of which is shiftable into different given positions along the length of said train and each with a chassis on which is mounted a body having a mechanism for dumping it; having motor means on each car to operate said mechanism to dump the body; a source of power for operating each motor means; and the train having power conveying lines connecting said power source to each of said motor means; a control system for regulating dumping of each body separately and independently from one another and for selectively dumping a given body of said train comprising an operator's station on said train, an operable control means for each motor means located on each of said cars and connected into the power conveying lines which connect the power source to the motor means on each car for regulating operation of said motor means, a first transmission means connecting the operable control means of a first car of the train to said operator's station and to said source of power for conveying power from said source through said station to said operable control means of the first car, a second transmission means connecting the operable control means of a second car of the train to said operator's station and to said source of power for conveying power from said source through said station to said operable control means of the second car, said first transmission means including a first power flow control means located at said operator's station, and interconnected into said first transmission means for regulating flow of power therethrough in operating the operable control means of the first car, said first power flow control means being the sole control means for regulation of flow of power through said first transmission means to the operable control means of a car in the position of said first car, said second transmission means including a second power flow control means located at said operator's station and interconnected into said second transmission means for regulating flow of power therethrough in operating the operable control means of the second car, said second power flow control means being the sole control means for regulation of flow of power through said second transmission means to the operable control means of a car in the position of said second car, said first and second transmission means being adapted to be connected to and disconnected from their respective control means so that dumping of a body of any said cars placed in the position of said first car in the train and connected to the first transmission means is controlled by said first power flow control means and so that the dumping of a body of any of said cars placed in the position of said second car in the train and connected to the second transmission means is controlled by said second power flow control means.

12. On a train having at least two cars, each of which is shiftable into different given positions along the length of said train and each with a chassis on which is mounted a body having a mechanism for dumping it; having motor means on each car to operate the mechanism to dump the body; a first source of power for operating each motor means; and the train having power conveying lines connecting said first power source to each of said motor means; a control system for regulating dumping of each body separately and independently of one another and for selectively dumping a given body of said train comprising an operator's station on said train, an operable control means for each motor means located on each of said cars and connected into the power conveying lines connecting said first source of power to the motor means on each car for regulating operation of said motor means, a first transmission means connecting the operable control means of a first car of the train to said operator's station and to a second source of power for conveying power from said second source through said station to said operable control means of the first car for operating said operable control means, a second transmission means connecting the operable control means of a second car of the train to said operator's station and to said second source of power for conveying power from said second source through said station to said operable control means of the second car for operating said control means, said first transmission means including a first power flow control means located at said operator's station and interconnected into said first transmission means for regulating flow of power therethrough in operation of the operable control means of the first car, said first power flow control means being the sole control means for regulation of flow of power through said first transmission means to the operable control means of a car in the position of said first car, said second transmission means including a second power flow control means located at said operator's station and interconnected into said second transmission means for regulating flow of power therethrough in operation of the operable control means of the second car, said second power flow control means being the sole control means for regulation of flow of power through said second transmission means to the operable control means of a car in the position of said second car, said first and second transmission means being adapted to be connected to and disconnected from their respective control means so that dumping of a body of any of said cars placed in the position of said first car in the train and connected to the first transmission means is controlled by said first power flow control means and so that the dumping of a body of any of said cars placed in the position of said second car in the train and connected to the second transmission means is controlled by said second power flow control means.

References Cited in the file of this patent

UNITED STATES PATENTS

| | | |
|---|---|---|
| 496,672 | Thacher | May 2, 1893 |
| 777,472 | Ingoldsby et al. | Dec. 13, 1904 |
| 816,008 | Goodwin | Mar. 27, 1906 |
| 909,307 | Ketchum | Jan. 12, 1909 |
| 1,555,594 | Macloskie | Sept. 29, 1925 |
| 1,786,815 | Aspinwall | Dec. 30, 1930 |
| 1,870,469 | Shepard | Aug. 9, 1932 |
| 2,112,466 | Maloon | Mar. 29, 1938 |
| 2,122,887 | McGrath | July 5, 1938 |
| 2,237,299 | Benbow et al. | Apr. 8, 1941 |
| 2,286,680 | Hines | June 16, 1942 |
| 2,300,933 | Keiler | Nov. 3, 1942 |
| 2,326,911 | Aikman | Aug. 17, 1943 |
| 2,387,896 | Giger | Oct. 30, 1945 |
| 2,627,432 | Poore | Feb. 3, 1953 |
| 2,717,492 | Quinn | Sept. 13, 1955 |